US011552775B1

(12) United States Patent
Turner

(10) Patent No.: US 11,552,775 B1
(45) Date of Patent: Jan. 10, 2023

(54) CLOCK SYNCHRONIZATION IN HALF-DUPLEX COMMUNICATION SYSTEMS

(71) Applicant: Ethernovia Inc., San Jose, CA (US)

(72) Inventor: Max Klaus Turner, Utrecht (NL)

(73) Assignee: Ethernovia Inc., San Jose, CA (US)

( * ) Notice: Subject to any disclaimer, the term of this patent is extended or adjusted under 35 U.S.C. 154(b) by 31 days.

(21) Appl. No.: 17/203,211

(22) Filed: Mar. 16, 2021

Related U.S. Application Data

(60) Provisional application No. 62/990,296, filed on Mar. 16, 2020.

(51) Int. Cl.
  *H04L 5/16* (2006.01)
  *H04L 5/14* (2006.01)
  *H04L 7/00* (2006.01)

(52) U.S. Cl.
  CPC ........... *H04L 5/16* (2013.01); *H04L 5/143* (2013.01); *H04L 5/1438* (2013.01); *H04L 5/1469* (2013.01); *H04L 7/0037* (2013.01)

(58) Field of Classification Search
  None
  See application file for complete search history.

(56) References Cited

U.S. PATENT DOCUMENTS

2007/0255116 A1* 11/2007 Mehta .................... G16H 40/67
                                                      600/300

* cited by examiner

*Primary Examiner* — Hong Shao
(74) *Attorney, Agent, or Firm* — Schwegman Lundberg & Woessner, P.A.

(57) ABSTRACT

Disclosed are systems, methods, and non-transitory computer-readable media for clock synchronization in half-duplex communication systems. Devices in a half-duplex system are synchronized based on time stamp values captured by each device that define a specified period of time that is of equal in length. The specified period of time spans two change-over periods to average the jitter and/or drift that occurs during each period. Each device uses these measured lengths to determine the variance in the rates at which the two internal clocks operates, which is then used to synchronizes the internal clocks of the two devices.

20 Claims, 10 Drawing Sheets

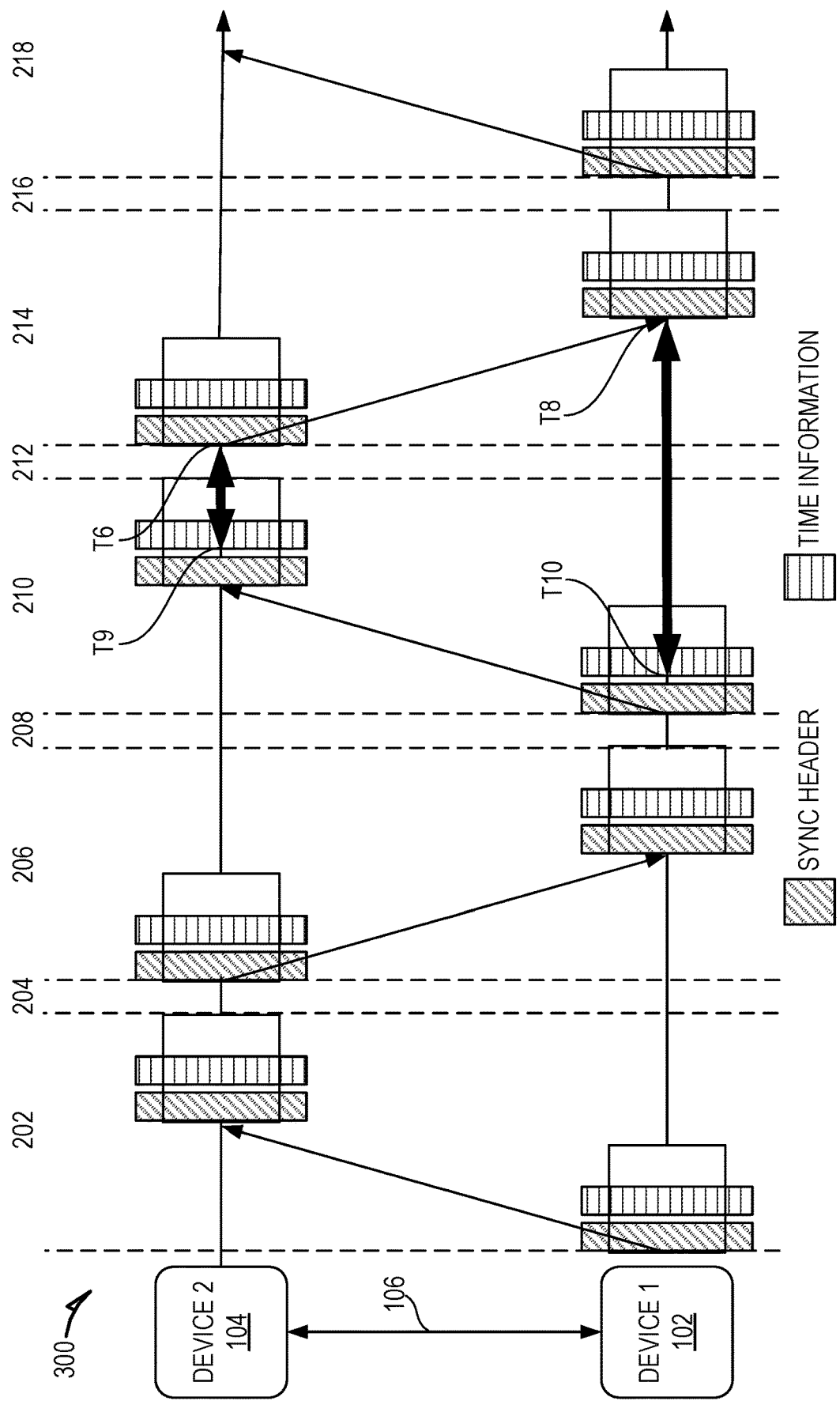

CLOCK SYNCHRONIZATION IN HALF-DUPLEX COMMUNICATION SYSTEMS

CROSS-REFERENCE TO RELATED APPLICATIONS

The present application claims the benefit of priority of U.S. Provisional Application No. 62/990,296, filed on Mar. 16, 2020, which is incorporated herein by reference in its entirety.

TECHNICAL FIELD

An embodiment of the present subject matter relates generally to clock synchronization, and more specifically, to clock synchronization in half-duplex communication systems.

BACKGROUND

A half-duplex communication system is a point-to-point system in which communications between two connected devices (e.g., link partners) is limited to one direction at a time. This contrasts with full-duplex communication systems in which connected devices may communicate with each other simultaneously in both directions. In a half-duplex system, devices take turns transmitting communications, during which one device transmits data while the other device receives the transmission. The other device must wait for the transmission to complete before replying. After a transmission has been completed, a change-over in the functioning of the devices occurs, in which no signals are transmitted. During this period, a change in the clock timing master for the communication link also occurs.

Use of half-duplex systems is particularly beneficial in applications with limited bandwidth, such as automotive system, because half-duplex systems use a single communication channel that is shared by the connected devices. While beneficial for reducing bandwidth, half-duplex systems provide challenges in relation to clock synchronization. For example, current professional standards used for synchronizing clocks in full-duplex systems (e.g., Precision Time Protocol (PTP)) are not applicable to half-duplex systems due to the change-over period that is not needed in full-duplex systems. Accordingly, improvements are needed.

BRIEF DESCRIPTION OF THE DRAWINGS

Various ones of the appended drawings merely illustrate example embodiments of the present disclosure and cannot be considered as limiting its scope.

FIGS. 3A-3E show communications between devices for clock synchronization in a half-duplex communication system, according to some example embodiments.

DETAILED DESCRIPTION

Figure 1:
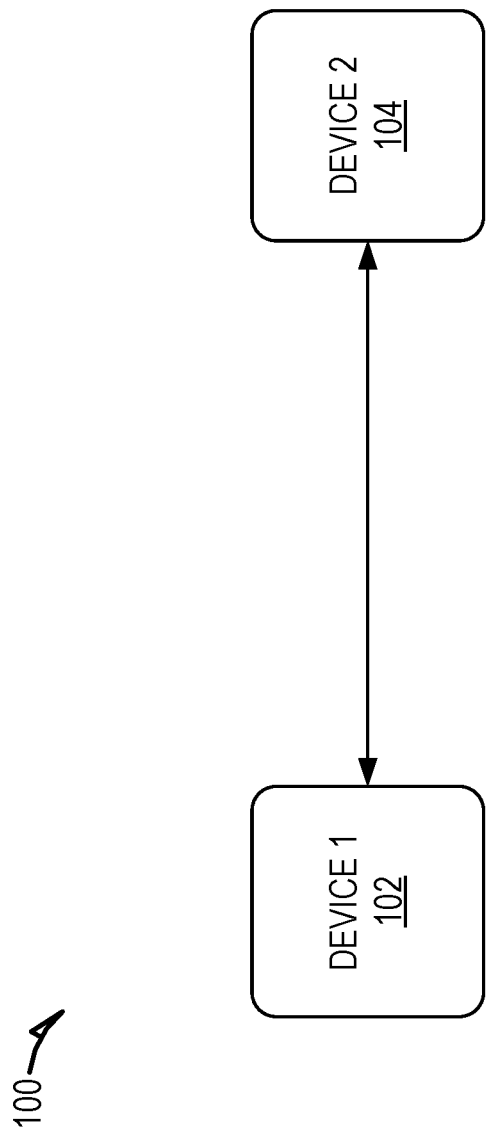
FIG. 1 is a block diagram of a half-duplex communication system, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for clock synchronization in half-duplex communication systems. In a half-duplex system, communications between connected devices is limited to one direction at a time. After a transmission by one device has been completed, a change-over in the functioning of the devices occurs, in which no signals are transmitted. As explained earlier, current professional standards used for synchronizing clocks in full-duplex systems (e.g., PTP) are not applicable to half-duplex systems due to the change-over period that is not needed in full-duplex systems.

To alleviate this issue, the devices in a half-duplex system are synchronized based on time stamp values captured by each device that define a specified period of time that is of equal in length. The specified period of time that is measured by each device may span two change-over periods to average the jitter and/or drift that occurs during each period.

To measure a specified period of time that is of equal length, one of the devices records a pair of time stamp values defining two distinct times at which the device began transmitting data to the other device. The other device similarly records a pair of time stamp values defining two distinct times at which the device began receiving those transmissions of data. Each device records the time stamp values using their respective internal clock.

While the specified period of time that is measured by each device is equal in length, the measurement of the specified time period captured by each device may vary due to a variance in the rates at which the clocks of each device operates. For example, one of the clocks may be operating at a faster rate than the other. Accordingly, the length of the specified period of time as determined from the pair of time stamp values captured by one of the devices may not match the length of the specified period of time as determined from the pair of time stamp values captured by the other device.

Each device uses these measured lengths to determine the variance in the rates at which the two internal clocks operates, which is then used to synchronizes the internal clocks of the two devices. To accomplish this, each device records time stamp values at specified milestones, such as initiating transmission of data, initially receiving data, and the like. The devices include the time stamp values in the communications they transmit to each other. Accordingly, each device may use the time stamp values it receives from the other device along with its own captured time stamp values for synchronization purposes, such as by calculating a neighbor rate ratio (NRR), delay and/or offset values.

FIG. 1 is a block diagram of a half-duplex communication system 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the half-duplex communication system 100 to facilitate additional functionality that is not specifically described herein.

As shown, the half-duplex communication system 100 is comprised of two devices 102, 104, which are interconnected via a communication link 106 for transporting data between the devices 102, 104. The communication link 106 may include a wired communication link, a wireless communication link, or a combination thereof. The devices 102, 104 may be any of a variety of types of electrical component that can transmit and/or receive data communications. For example, a device 102, 104 may be a sensor, computing device, input device, display, actuator, switch, speakers, other output device, and the like. The devices 102, 104 can include some or all of the features, components, and peripherals of the machine 600 shown in FIG. 6. Each of the devices 102, 104 may also be The half-duplex communication system 100 may be implemented in any of a variety of applications to provide for network communication between connected devices 102, 104. For example, the half-duplex communication system 100 may be implemented within a vehicle (e.g., automobile, truck, airplane, ship, etc.) to provide for various electronics features and functionality, including safety-critical features.

The half-duplex communication system 100 is a point-to-point system in which communications between the connected devices 102, 104 is limited to one direction at a time via the communication link 106. That is, the devices 102, 104 take turns transmitting communications to each other via the communication link 106, during which one device 102 transmits data while the other device 104 receives the transmission. The other device 104 must wait for the transmission to complete before replying. After a transmission has been completed, a change-over in the functioning of the devices 102, 104 occurs, in which no signals are transmitted.

Figure 2:
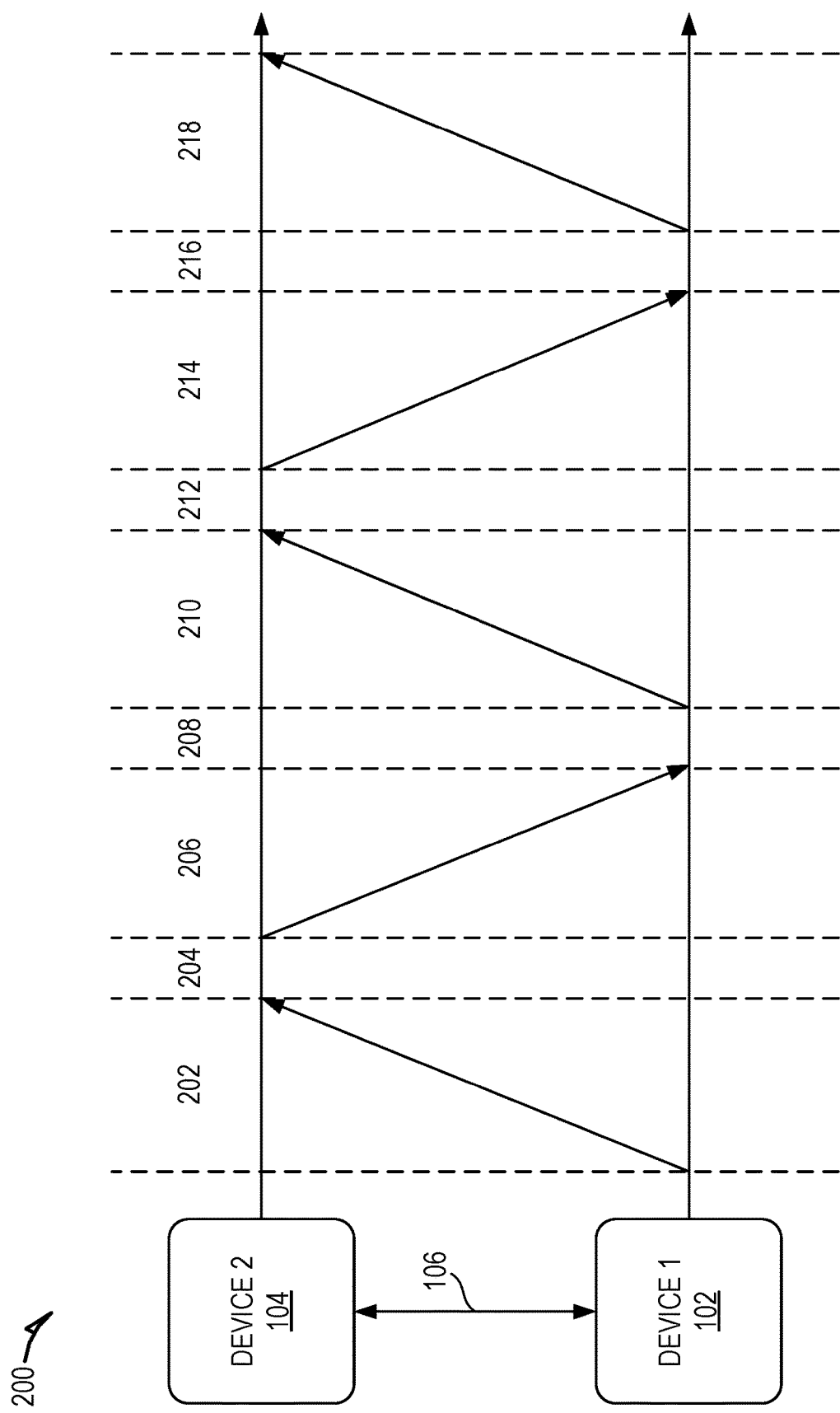
FIG. 2 shows communications between devices in a half-duplex communication system, according to some example embodiments.

FIG. 2 shows communications between devices 102, 104 in a half-duplex communication system 200, according to some example embodiments. As shown, communications between device 1 102 and device 2 104 are in one direction at a time. That is, device 1 102 and device 2 104 take turns transmitting communications to each via the communication link 106. For example, during a first communication period 202, device 1 102 transmits a communication to device 2 104. This is followed by a first change-over period 204 during which communications are not transmitted between device 1 102 and device 2 104. The first change-over period 204 is followed by a second communication period 206 during which device 2 104 transmits a communication to device 1 104. The second communication period 206 is followed by a second change-over period 208, after which the pattern continues with device 1 102 transmitting a communication to device 2 104 during a third communication period 210, followed by a third change-over period 212, and a fourth communication period 214 during which device 2 104 transmits a communication to device 1 104. Only one of the two devices 102, 104 transmits a communication during any communication period 202, 206, 210, 214, and neither device transmits a communication during a change-over period 204, 208, 212.

Figure 3A:
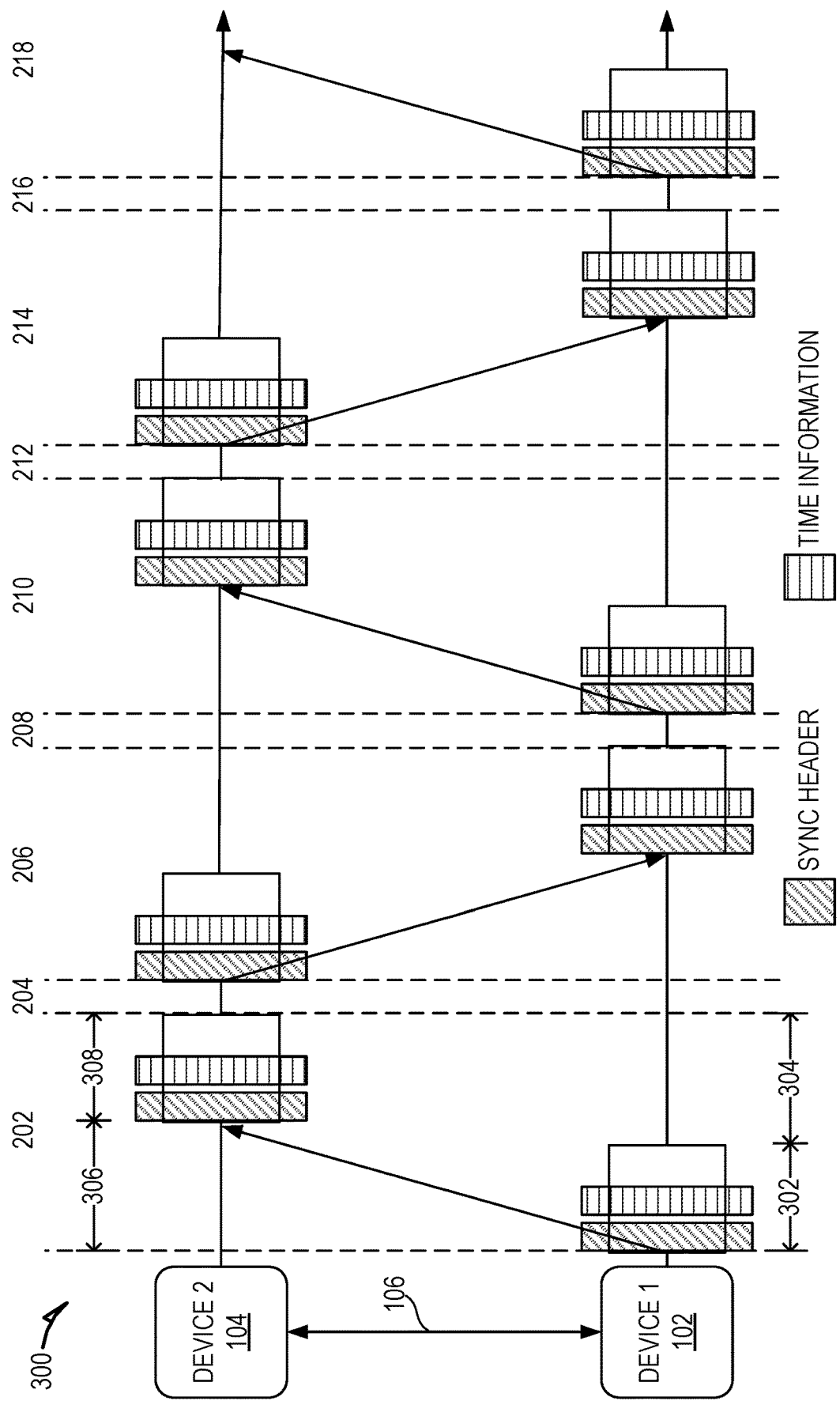

FIGS. 3A-3E show communications between devices 102, 104 for clock synchronization in a half-duplex communication system 300, according to some example embodiments. As shown in FIG. 3A, the devices 102, 104 take turns transmitting communications to each during communication periods 202, 206, 210, 214, 218. For example, during a first communication period 202, device 1 102 transmits a communication to device 2 104. This is followed by a first change-over period 204 during which no communications are transmitted between the devices 102, 104. The first change-over period 204 is followed by a second communication period 206 during which device 2 104 transmits a communication device 1 102. A second change-over period 208 follows the second communication period 206, and the pattern repeats.

During each communication period, both devices 102, 104 experience a delay 304, 306 associated with transmission of data across the communication link 106. When experiencing a delay 304, 306, a device 102, 104 is neither transmitting nor receiving data. For example, during the first communication period 202, device 1 102 initially transmits data to device 2 104 during a transmission period 302, after which device 1 102 experiences a delay 304. In contrast, device 2 104 initially experiences a delay 306 during the first communication period 202, after which device 2 104 receives the data transmitted by device 1 102 during a receiving period 308.

The delay 304, 306 experienced by each device 102, 104 represents an amount of time it takes for data to travel between the devices 102, 104 via the communication link 106. For example, the delay 304 experienced by device 1 102 represents a period of time measured from the time at which device 1 102 completes transmission of data to the time at which device 2 104 has received the entirety of the data transmitted from device 1 102. Similarly, the delay 306 experienced by device 2 103 represents a period of time measured from the time that device 1 102 initiates transmission of data to device 2 104 to the time at which device 2 104 initially receives the data transmitted from device 1 102.

The delays 304, 306 experienced by each device 102, 104 during a communication period are equal in length. For example, the delay 304 experienced by device 1 102 during the first communication period 202 is equal in length to the delay 306 experienced by device 2 104 during the first communication period 202. Likewise, the transmission period 302 and receiving period 308 that occur during each communication period are also equal in length. For example, the transmission period 302 experienced by device 1 102 during the first communication period 202 is equal in length to the receiving period 308 experienced by device 2 104 during the first communication period 202

As shown, the data transmitted during each communication period 202, 206, 210, 214, 218 begins with a sync header, followed by time information, and then the actual data being transmitted in the communication. The sync header includes data that is used by a device 102, 104 to adjust the rate of its clock. A device 102, 104 that receives a sync header adjusts the rate of its clock in order to be syntonus with the clock rate of the other device 102, 104. For example, in the first communication period 202, device 2 104 uses the sync header received from device 1 102 to adjust the rate of its clock in order to be syntonus with the clock rate of device 1 102. This adjustment may be performed by a device 102, 104 such that the rate of its clock has been adjusted when it begins receiving the time information that follows the sync header.

The time information includes time stamp values captured by the devices 102, 104. As explained earlier, the devices 102, 104 in the half-duplex system are synchronized based on time stamp values captured by each device 102 104 that define a specified period of time that is of equal in length. For example, the time data may include time stamp values indicating times at which a device 102, 104 initiated a data transmission, completed a data transmission, began receiving a data transmission, received the end of a data transmission, and the like. The devices 102, 104 may use the time information received from the other device 102, 104 along with internally collected time stamp values to determine a variance in the rate of the clocks of the two devices, calculate an offset value, and the like. The specified period of time that is measured by each device 102, 104 may span two change-over periods 204, 208, 212, 216 to average the jitter and/or drift that occurs during each period.

Figure 3B:
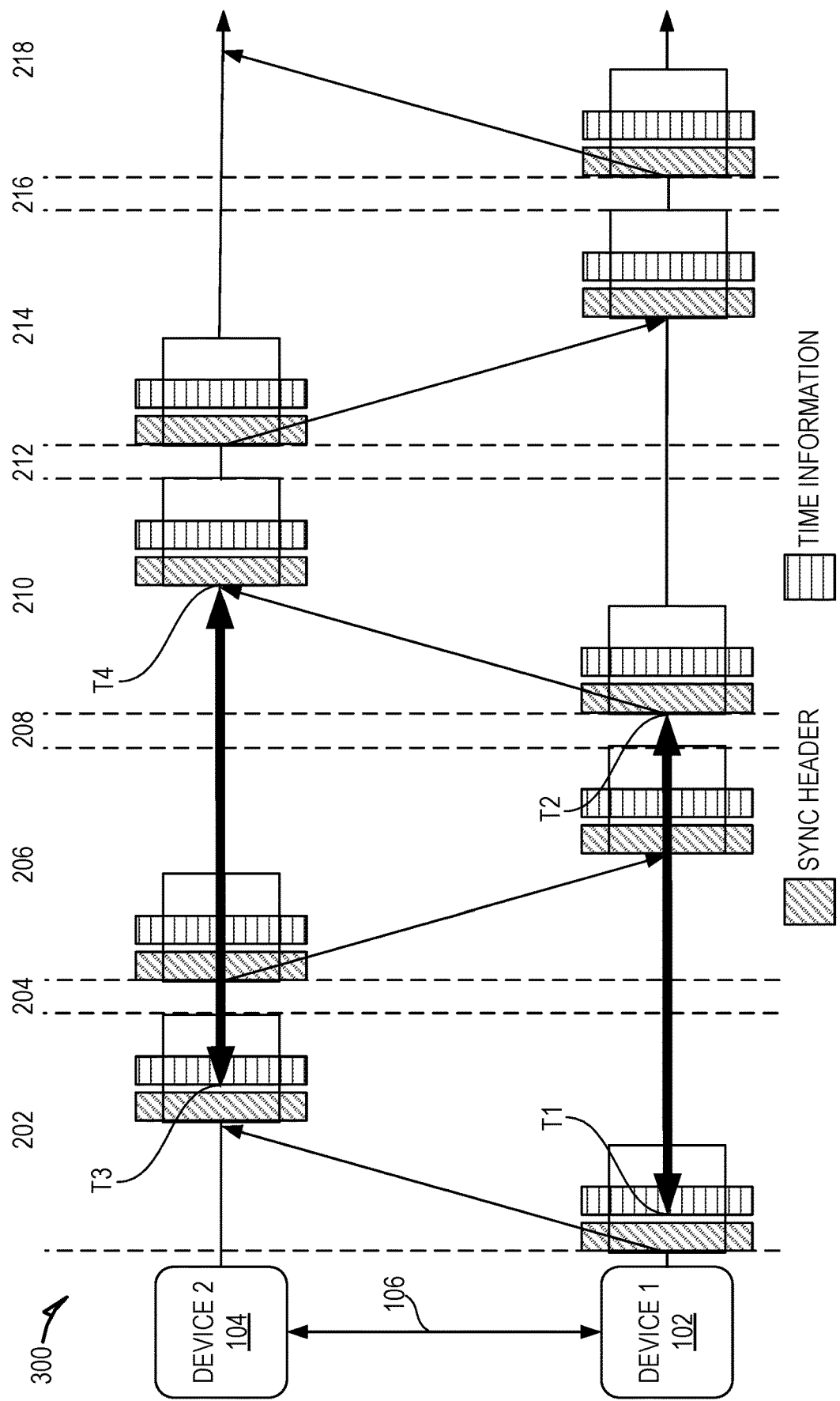

FIG. 3B shows events recorded by devices 102, 104 for clock synchronization in a half-duplex communication system 300, according to some example embodiments. To synchronize the clocks of the devices 102, 104, a specified period of time that is known to be equal in length is measured by each device 102, 104 using its respective internal clock. The specified period of time that is measured by each device may be selected to optimize calculation of the variance between the rates of the two clocks. For example, the specified period of time may span two change-over periods to average the jitter and/or drift that occurs during each. Further, the specified period of time may be based on a time at which an internal clock of a device 102, 104 has been synchronized, such as after the device 102, 104 has received sync data from the other device 102, 104.

As shown, device 1 102 and device 2 104 both capture time stamp values defining a specified period of time that is of a known equal length. For example, device 1 102 captures a time stamp values at time T1 and time T2. Time T1 indicates the time at which device 1 102 begins transmitting the time information to device 2 104 during the first communication period 202. Time T2 indicates the time at which device 1 102 begins transmitting a subsequent data transmission to device 2 104 during the third communication period 210.

Device 2 104 captures corresponding time stamp values at time T3 and time T4. Time T3 corresponds to time T1 and indicates the time at which device 2 103 began receiving the time information transmitted by device 1 102 during the first communication period 202. Time T4 corresponds to time T2 and indicates the time at which device 2 104 begins receiving the subsequent data transmission from device 1 102 within the third communication period 210.

The time stamp values captured by each device 102, 104 are based on an internal clock of the respective device 102, 104 that captured the time stamp value. For example, the time stamp values captured at the time T1 and time T2 are captured by device 1 102 based on the internal clock of device 1 102. Similarly, the time stamp values captured time T3 and time T4 are captured by device 2 104 using an internal clock of device 2 104.

Although the specified period of time that was measured by each device 102, 104 is of equal length, the measured length of the specified period of time based on the time stamp values captured by each device may vary due to variances in the rates at which the internal clock of each device 102, 104 operates. Accordingly, the lengths of the specified period of time as measured by each device 102, 104 can be used to determine the variance in the rates at which the clocks of the devices 102, 104 is operating.

Each device 102, 104 may share the time stamp values it captures with the other device 102, 104, thereby allowing each device 102, 104 to calculate the variance in the rates at which their clocks are operating. For example, device 2 104 includes the time stamp values captured at time T3 and time T4 in the time information that is transmitted to device 1 102 during the fourth communication period 214. Device 1 102 uses the received time stamp values to determine a length of the predetermined period of time as measured by device 2 104, and uses the time stamp value captured by its own internal clock at time T1 and T2 to determine the length of the predetermined period of time as measured by device 1 102. Device 1 102 then compares the two determined lengths to determine a NRR that indicates the rate at which clock of device 2 104 is operating in relation to its own internal clock. For example, device 1 102 may use the following formula to calculate the NRR.

$$NRR = (T4 - T3)/(T2 - T1)$$

Device 1 102 may use the NRR to determine a synchronized time, which may be sent to device 2 104 in a subsequent communication.

Figure 3C:
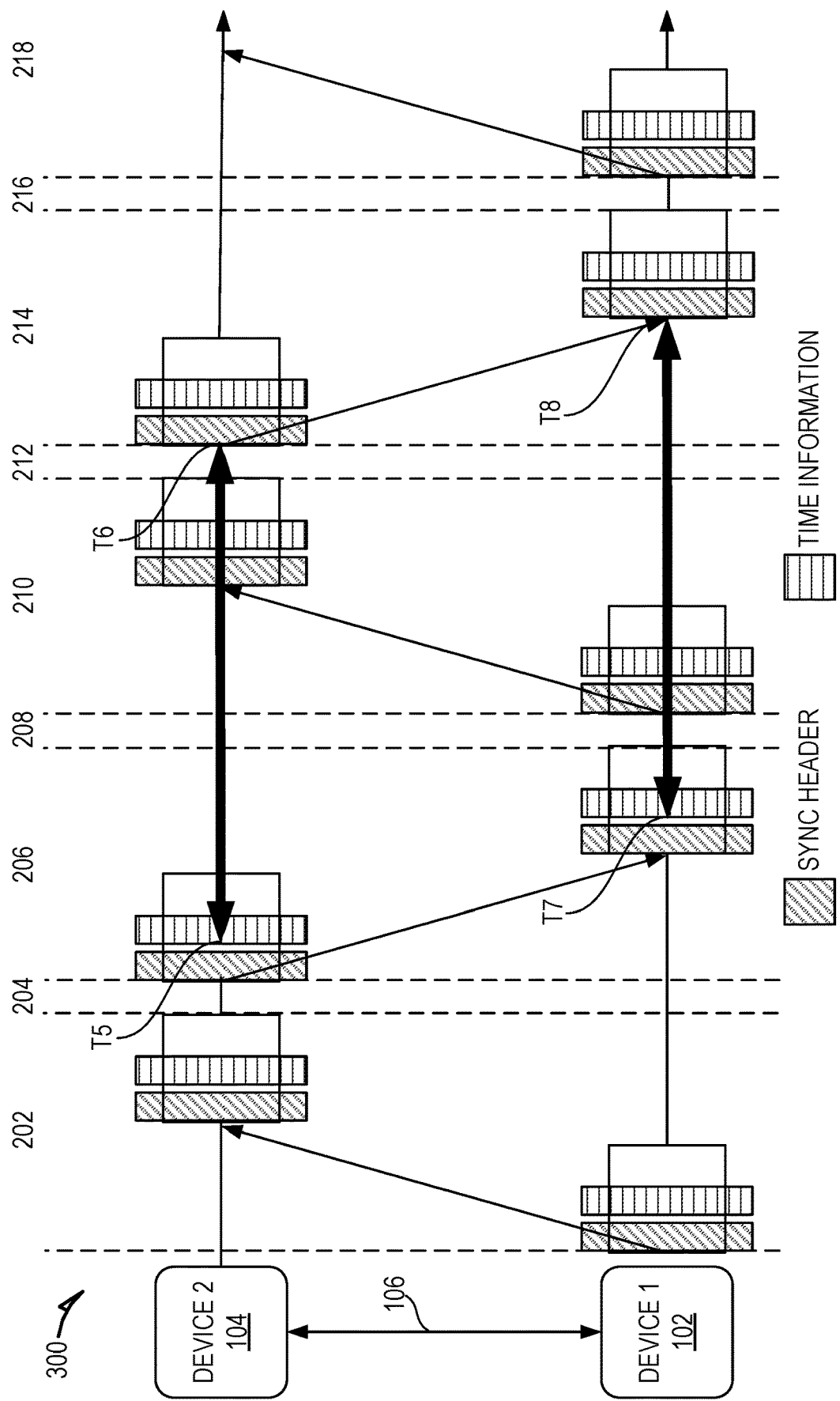

As shown in FIG. 3C, device 2 104 calculate the NRR in a similar manner. In FIG. 3C, device 2 captures time stamp values at time T5 and time T6. Time T5 indicates the time at which device 2 104 begins transmitting time information to device 1 104 during the second communication period 206. Time T6 indicates a the time at which device 2 104 begins transmitting a subsequent data transmission to device 1 102 during the fourth communication period 214.

Device 1 102 captures corresponding time stamp values at time T7 and time T7. Time T7 corresponds to time T5 and represents the moment within the second communication period 206 at which the time information transmitted by device 2 106 is first received by device 1 102. Time T8 corresponds to time T6 and represents the moment within the fourth communication period 214 at which device 1 102 begins receiving the subsequent data transmission from device 2 104.

Device 1 102 includes the time stamp values captured at time T7 and time T8 in the time information that is transmitted to device 2 104 during the fifth communication period 218. Device 2 104 uses the received time stamp values to determine a length of the predetermined period of time as measured by device 1 102, and uses the time stamp value captured by its own internal clock at time T5 and T6 to determine the length of the predetermined period of time as measured by device 2 104. Device 2 104 then compares the two determined lengths to determine a neighbor rate ratio (NRR) that indicates the rate at which the clock of device 1 102 is operating in relation to its own internal clock. For example, device 2 104 may use the following formula to calculate the NRR.

$$NRR = (T8 - T7)/(T6 - T5)$$

Device 2 104 may use the NRR to determine a synchronized time, which may be transmitted to device 1 102 in a subsequent communication.

Figure 3D:
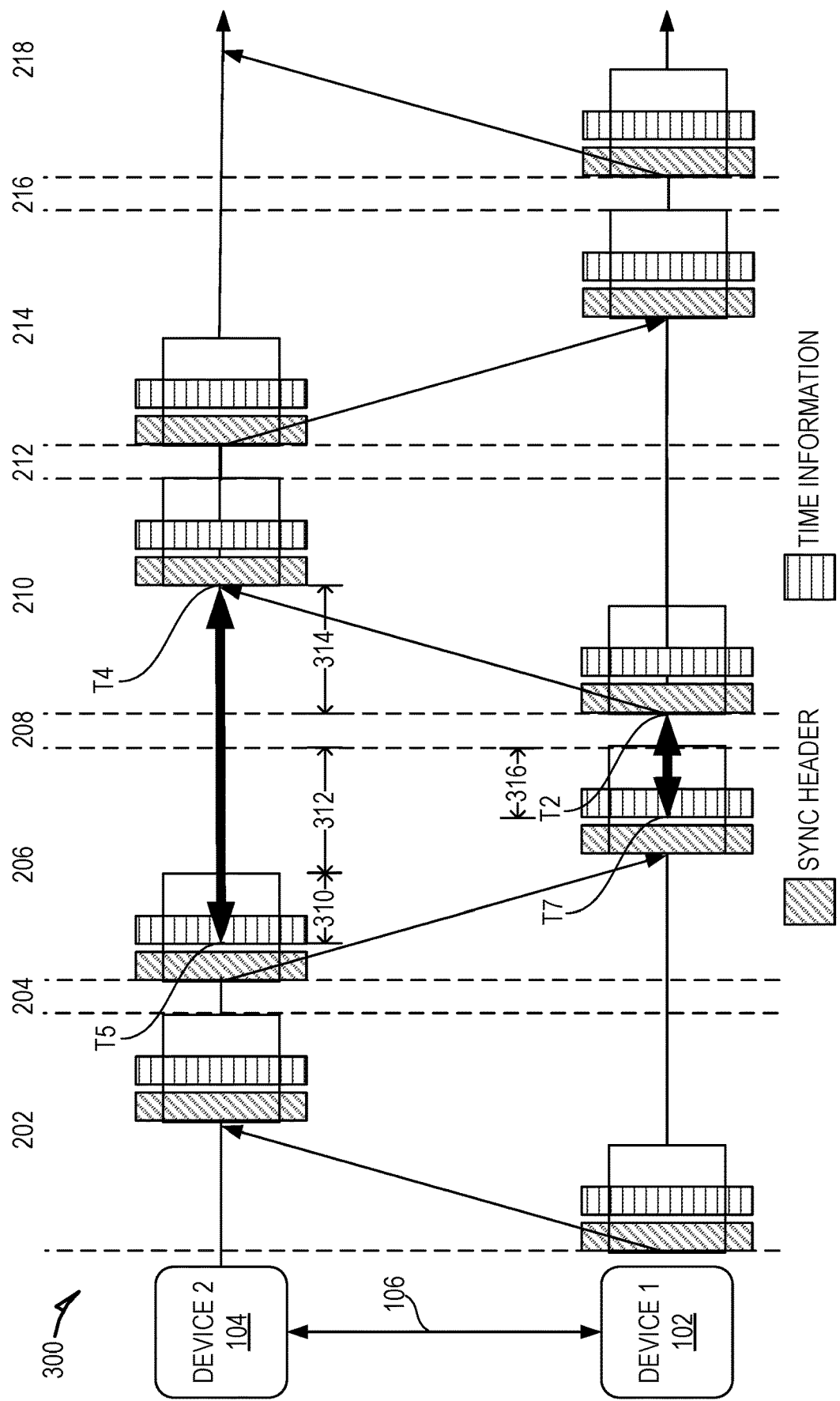

The time stamp values captured by each device 102, 104 may also be used to calculate the delay time associated with transmitting data across the communication link 106. Calculating the delay time can be useful for variety of reasons, such as detecting man in the middle attacks To determine the delay time, the time stamp values captured by each device 102, 104 are used to identify two specified periods of length of different length, as is shown in FIG. 3D. As shown, device 2 104 determines a specified period of time that spans from time T5 to time T4, and device 1 102 determines another specified period of time that spans from time T7 to time T2. Time T5 indicates the time at which device 2 104 begins transmitting time information to device 1 104 during the second communication period 206 and time T4 indicates the time at which device 2 104 begins receiving the subsequent data transmission from device 1 102 within the third communication period 210. Time T7 corresponds to time T5 and represents the moment within the second communication period 206 at which the time information transmitted by device 2 106 is first received by device 1 102. Time T2 indicates the time at which device 1 102 begins transmitting a subsequent data transmission to device 2 104 during the third communication period 210.

The specified period of time spanning from time T5 to time T4, as measured by device 2 104, includes a transmission period 310, two delays 312, 314, and change-over period 208. The specified period of time spanning from time T7 to time T2, as measured by device 1 102, includes a receiving period 316 and the change-over period 208. The receiving period 316 measured by device 1 102 is equal in length to the transmission period 310 measured by 312. Accordingly, subtracting the specified period of time spanning from time T7 to time T2 (i.e., the receiving period 316 and the change-over period 208) from the specified period of time spanning from time T5 to time T4 (i.e., receiving period 316 and the change-over period 208) results in a period of time spanning only the two delays 312, 314. As the delay 312, 314, dividing this value in half provides the delay.

As explained earlier, the internal clocks of each device 102, 104 may operate at slightly different rates. To account for this possible variance, each device 102, 104 may apply the calculated NRR to adjust the specified period of time determined by the other device 102, 104. For example, device 1 102 may apply the NRR that was calculated by device 1 102 to the measurement of the specified period of time that is captured by the clock of device 2 104. Similarly, device 2 104 may apply the NRR that was calculated by device 2 104 to the measurement of the specified period of time that is captured by the clock of device 1 102. For example, device 1 102 uses the following equation to determine the delay in relation to the example presented in FIG. 3D. In the equation, NRR is the NRR calculated by device 1 102.

$$\text{Delay} = ((T4 - T5) * NRR - (T2 - T7))/2$$

FIG. 3E shows that device 2 104 calculates the delay in a similar manner. For example, device 2 104 calculates the delay using the following equation, where the NRR is the NRR calculated by device 2 104.

$$\text{Delay} = ((T8 - T10) * NRR - (T6 - T9))/2$$

Figure 4:
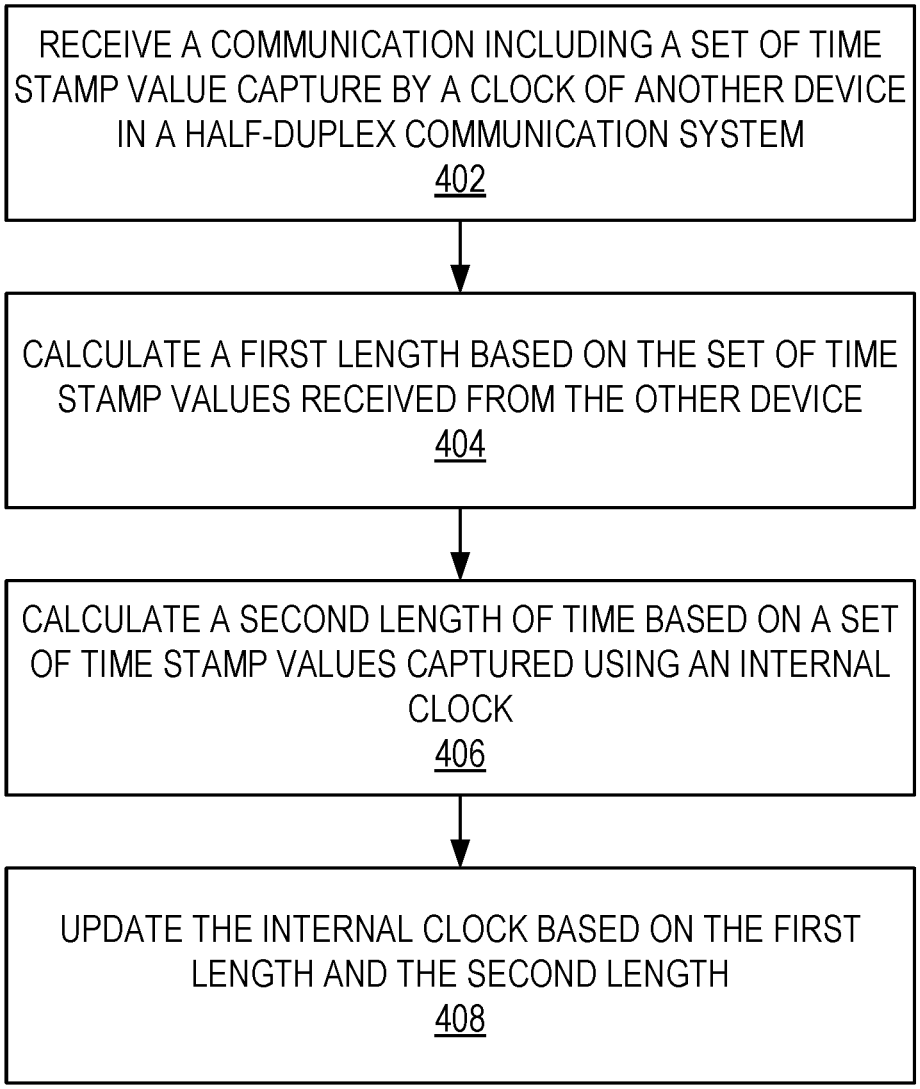
FIG. 4 is a flowchart showing a method for clock synchronization in a half-duplex communication system, according to some example embodiments.

FIG. 4 is a flowchart showing a method 400 for clock synchronization in a half-duplex communication system 100, according to some example embodiments. The method 400 may be embodied in computer readable instructions for execution by one or more processors such that the operations of the method 400 may be performed in part or in whole by device 1 102; accordingly, the method 400 is described below by way of example with reference to device 1 102. However, it shall be appreciated that at least some of the operations of the method 400 may be deployed on various other hardware and/or software configurations and the method 400 is not intended to be limited to device 1 102.

At operation 402, device 1 102 receives a communication from device 2 104 that includes a set of time stamp values captured by a clock of device 2 104. The time stamp values defines a specified period of time as measured by the clock of device 2 104. The specified period of time as measured by the clock of device 2 104 is known to be equal in length to a specified period of time as measured by a clock of device 1 102.

At operation 404, device 1 102 calculates a first length of time based on the set of time stamp values received from device 2 104. The first length of time defines the specified period of time as measured by the clock of device 2 104.

At operation 406, device 1 102 calculates a second length of time based on a set of time stamp values captured by device 1 102. The set of time stamp values captured by device 1 102 defines a specified period of time as measured by the clock of device 1 102 that is known to be equal in length to the specified period of time as measured by the clock of device 2 104. The second length of time defines the specified period of time as measured by the clock of device 1 102.

At operation 408, device 1 102 updates its clock based on the first length of time and the second length of time. For example, device 1 102 compares the first length of time and the second length of time to calculate a variance in the rates at which the two clocks are operating. Device 1 102 can use this determined variance to adjust the rate of its clock with the aim of synchronizing the clocks.

Software Architecture

Figure 5:
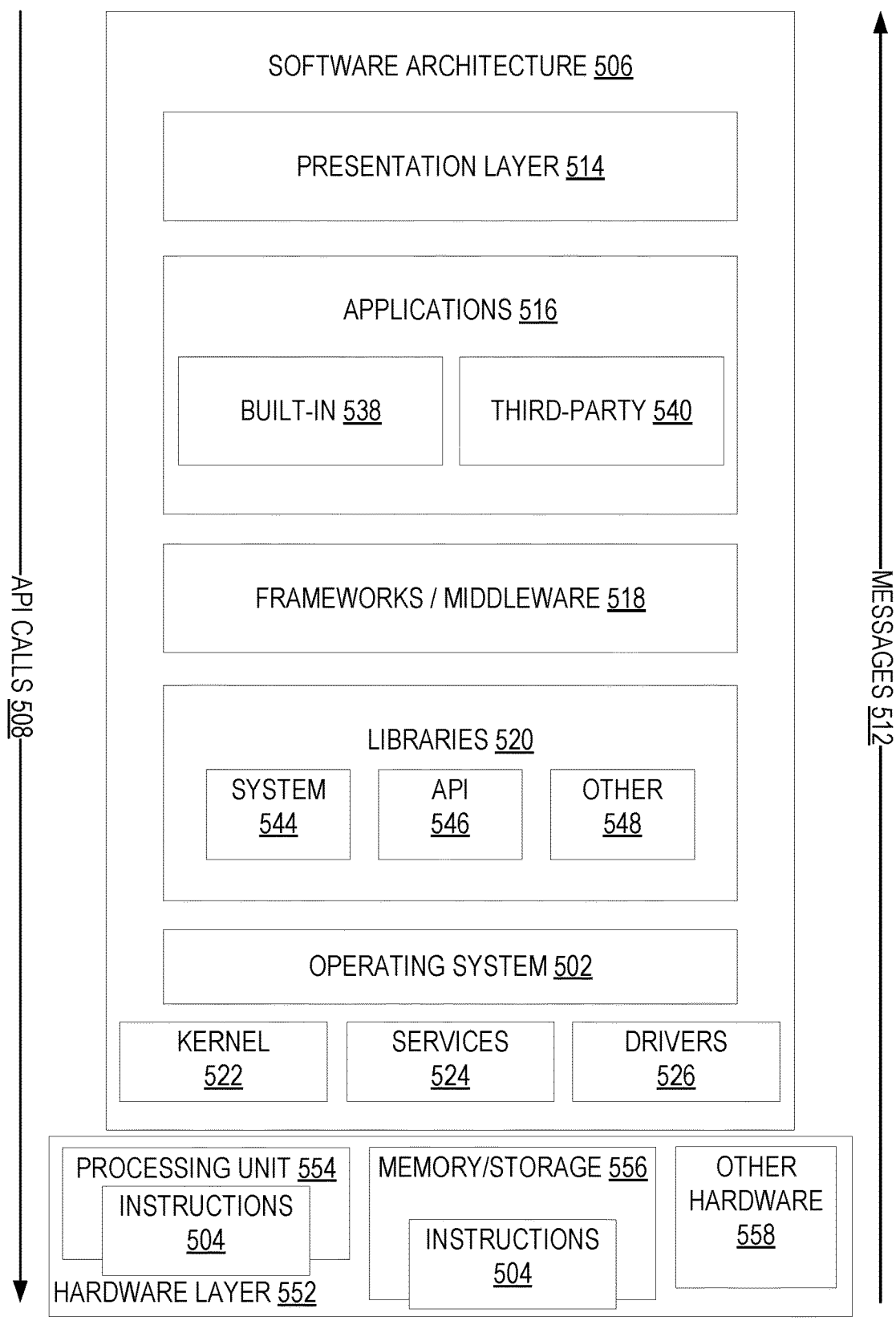
FIG. 5 is a block diagram illustrating an example software architecture, which may be used in conjunction with various hardware architectures herein described.

FIG. 5 is a block diagram illustrating an example software architecture 506, which may be used in conjunction with various hardware architectures herein described. FIG. 5 is a non-limiting example of a software architecture 506 and it will be appreciated that many other architectures may be implemented to facilitate the functionality described herein. The software architecture 506 may execute on hardware such as machine 600 of FIG. 6 that includes, among other things, processors 604, memory 614, and (input/output) I/O components 618. A representative hardware layer 552 is illustrated and can represent, for example, the machine 600 of FIG. 6. The representative hardware layer 552 includes a processing unit 554 having associated executable instructions 504. Executable instructions 504 represent the executable instructions of the software architecture 506, including implementation of the methods, components, and so forth described herein. The hardware layer 552 also includes memory and/or storage modules 556, which also have executable instructions 504. The hardware layer 552 may also comprise other hardware 558.

In the example architecture of FIG. 5, the software architecture 506 may be conceptualized as a stack of layers where each layer provides particular functionality, such as the Open Systems Interconnection model (OSI model). For example, the software architecture 506 may include layers such as an operating system 502, libraries 520, frameworks/middleware 518, applications 516, and a presentation layer 514. Operationally, the applications 516 and/or other components within the layers may invoke application programming interface (API) calls 508 through the software stack and receive a response such as messages 512 in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524, and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 (also sometimes referred to as middleware) provide a higher-level common infrastructure that may be used by the applications 516 and/or other software components/modules. For example, the frameworks/middleware 518 may provide various graphical user interface (GUI) functions, high-level resource management, high-level location services, and so forth. The frameworks/middleware 518 may provide a broad spectrum of other APIs that may be used by the applications 516 and/or other software components/modules, some of which may be specific to a particular operating system 502 or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524, and/or drivers 526), libraries 520, and frameworks/middleware 518 to create UIs to interact with users of the system. Alternatively, or additionally, in some systems, interactions with a user may occur through a presentation layer, such as presentation layer 514. In these systems, the application/component "logic" can be separated from the aspects of the application/component that interact with a user.

Figure 6:
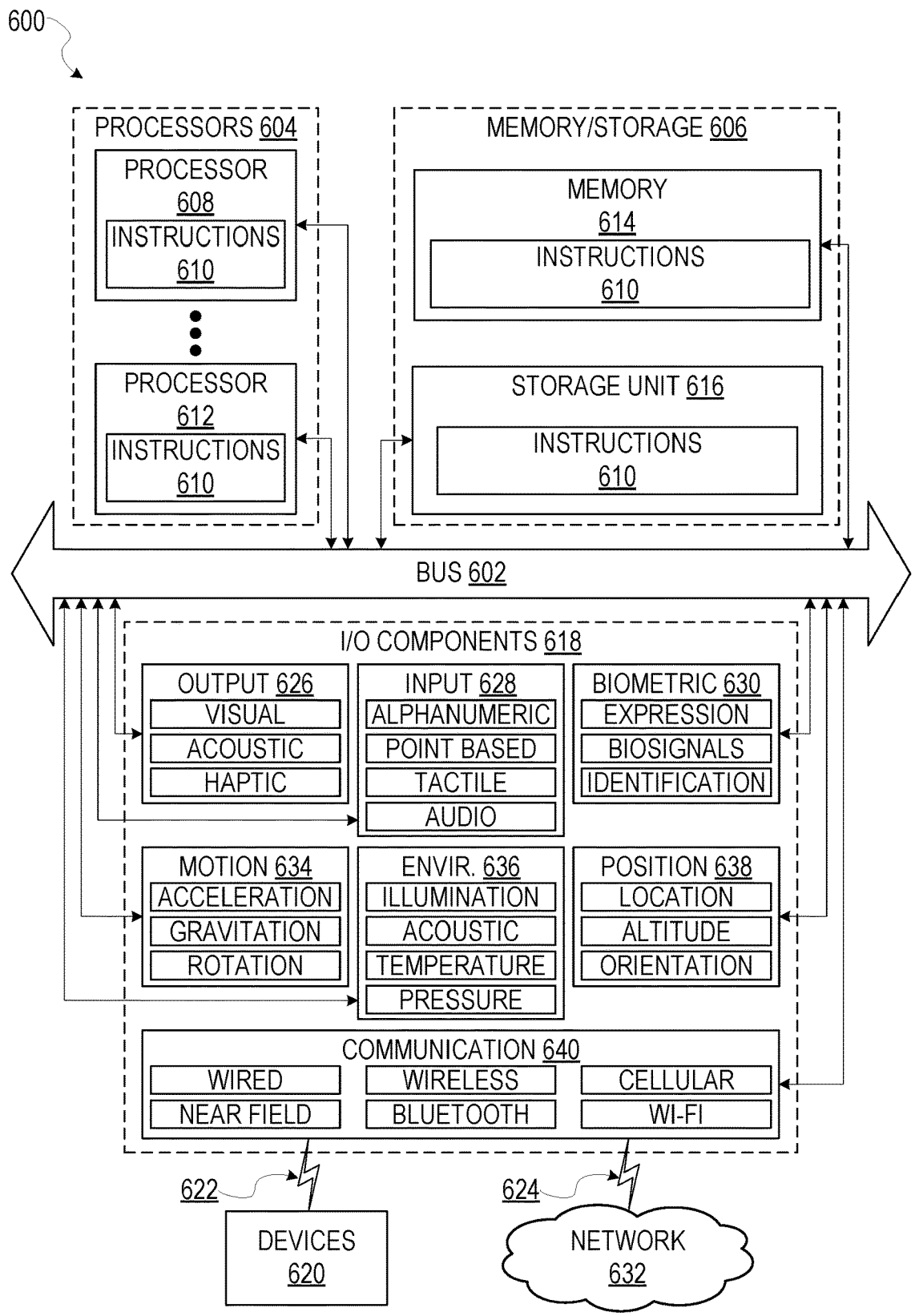
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 504 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 600 capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 610 for execution by the machine 600, and includes digital or analog communications signals or other intangible medium to facilitate communication of such instructions 610. Instructions 610 may be transmitted or received over the network 632 using a transmission medium via a network interface device and using any one of a number of well-known transfer protocols.

"CLIENT DEVICE" in this context refers to any machine 600 that interfaces to a communications network 632 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 632 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 632 or a portion of a network 632 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 610 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions 610 (e.g., code) for execution by a machine 600, such that the instructions 610, when executed by one or more processors 604 of the machine 600, cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 604) may be configured by software (e.g., an application 516 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 604 or other programmable processor 604. Once configured by such software, hardware components become specific machines 600 (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor or processors 604, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 602) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more processors 604. Similarly, the methods described herein may be at least partially processor-implemented, with a particular processor or processors 604 being an example of hardware. For example, at least some of the operations of a method may be performed by one or more processors 604 or processor-implemented components. Moreover, the one or more processors 604 may also operate to support performance of the relevant operations in a "cloud computing" environment or as a "software as a service" (SaaS). For example, at least some of the operations may be performed by a group of computers (as examples of machines 600 including processors 604), with these operations being accessible via a network 632 (e.g., the Internet) and via one or more appropriate interfaces (e.g., an API). The performance of certain of the operations may be distributed among the processors 604, not only residing within a single machine 600, but deployed across a number of machines 600. In some example embodiments, the processors 604 or processor-implemented components may be located in a single geographic location (e.g., within a home environment, an office environment, or a server farm). In other example embodiments, the processors 604 or processor-implemented components may be distributed across a number of geographic locations.

"PROCESSOR" in this context refers to any circuit or virtual circuit (a physical circuit emulated by logic executing on an actual processor 604) that manipulates data values according to control signals (e.g., "commands," "op codes," "machine code," etc.) and which produces corresponding output signals that are applied to operate a machine 600. A processor 604 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 604 may further be a multi-core processor having two or more independent processors 604 (sometimes referred to as "cores") that may execute instructions 610 contemporaneously.

What is claimed is:

1. A method comprising:
   receiving, by a first device in a half-duplex computing system, a first communication from a second device in the half-duplex computing system, the first communication including time info comprising a first set of time stamp values captured by the second device according to a clock of the second device;
   calculating, based on the first set of time stamp values, a first period of time spanning from a first time at which the second device received time information in a first previous communication transmitted by the first device to a second time at which the second device received a sync-header in a second previous communication transmitted by the first device, the second previous communication having been transmitted after the first previous communication;
   calculating, based on a second set of time stamp values captured by the first device according to a clock of the first device, a second period of time spanning from a third time at which the first device transmitted the time information to the second device in the first previous communication to a fourth time at which the first device transmitted the second previous communication to the second device; and
   updating the clock of the first device based on the first period of time and the second period of time.

2. The method of claim 1, wherein updating the clock of the first device comprises:

determining a neighbor ratio rate based on the first period of time and the second period of time.

3. The method of claim 2, wherein updating the clock of the first device further comprises:
   calculating a delay indicating an amount of time that for data to travel across a communication link connecting the first device to the second device in the half-duplex computing system.

4. The method of claim 3, wherein calculating the delay comprises:
   determining a third period of time spanning from a fifth time at which the second device transmitted time information to the first device in a third previous communication to the second time at which the second device received the sync-header in the second previous communication transmitted by the first device, the third previous communication having been transmitted between the second previous communication and the first previous communication;
   determining a fourth period of time spanning from a sixth time at which the first device received the time information in the third previous communication to the fourth time at which the first device transmitted the second previous communication to the second device; and
   calculating the delay based on the third period of time and the fourth period of time.

5. The method of claim 1, further comprising:
   after updating the clock of the first device, transmitting, to the second device, time information comprising a third set of time stamp values captured by the first device according to the clock of the first device, wherein second device uses the third set of time stamp values to update the clock of the second device.

6. The method of claim 1, wherein the first period of time spans two cross-over period during which a direction of communications in the half-duplex computing system alternates between a first direction and a second direction.

7. The method of claim 1, wherein the third time is determined by the first device after a synchronization of the clock of the first device based on synchronization data received from the second device.

8. A first device in a half-duplex computing system comprising:
   one or more computer processors; and
   one or more computer-readable mediums storing instructions that, when executed by the one or more computer processors, cause the first device to perform operations comprising:
   receiving a first communication from a second device in the half-duplex computing system, the first communication including time info comprising a first set of time stamp values captured by the second device according to a clock of the second device;
   calculating, based on the first set of time stamp values, a first period of time spanning from a first time at which the second device received time information in a first previous communication transmitted by the first device to a second time at which the second device received a sync-header in a second previous communication transmitted by the first device, the second previous communication having been transmitted after the first previous communication;
   calculating, based on a second set of time stamp values captured by the first device according to a clock of the first device, a second period of time spanning from a third time at which the first device transmitted the time information to the second device in the first previous communication to a fourth time at which the first device transmitted the second previous communication to the second device; and updating the clock of the first device based on the first period of time and the second period of time.

9. The first device of claim 8, wherein updating the clock of the first device comprises:

determining a neighbor ratio rate based on the first period of time and the second period of time.

10. The first device of claim 9, wherein updating the clock of the first device further comprises:

calculating a delay indicating an amount of time that for data to travel across a communication link connecting the first device to the second device in the half-duplex computing system.

11. The first device of claim 10, wherein calculating the delay comprises:

determining a third period of time spanning from a fifth time at which the second device transmitted time information to the first device in a third previous communication to the second time at which the second device received the sync-header in the second previous communication transmitted by the first device, the third previous communication having been transmitted between the second previous communication and the first previous communication;

determining a fourth period of time spanning from a sixth time at which the first device received the time information in the third previous communication to the fourth time at which the first device transmitted the second previous communication to the second device; and calculating the delay based on the third period of time and the fourth period of time.

12. The first device of claim 8, the operations further comprising:

after updating the clock of the first device, transmitting, to the second device, time information comprising a third set of time stamp values captured by the first device according to the clock of the first device, wherein second device uses the third set of time stamp values to update the clock of the second device.

13. The first device of claim 8, wherein the first period of time spans two cross-over period during which a direction of communications in the half-duplex computing system alternates between a first direction and a second direction.

14. The first device of claim 8, wherein the third time is determined by the first device after a synchronization of the clock of the first device based on synchronization data received from the second device.

15. A non-transitory computer-readable medium storing instructions that, when executed by one or more computer processors of a first device in a half-duplex computing system, cause the first device to perform operations comprising:

receiving a first communication from a second device in the half-duplex computing system, the first communication including time info comprising a first set of time stamp values captured by the second device according to a clock of the second device;

calculating, based on the first set of time stamp values, a first period of time spanning from a first time at which the second device received time information in a first previous communication transmitted by the first device to a second time at which the second device received a sync-header in a second previous communication transmitted by the first device, the second previous communication having been transmitted after the first previous communication;

calculating, based on a second set of time stamp values captured by the first device according to a clock of the first device, a second period of time spanning from a third time at which the first device transmitted the time information to the second device in the first previous communication to a fourth time at which the first device transmitted the second previous communication to the second device; and updating the clock of the first device based on the first period of time and the second period of time.

16. The non-transitory computer-readable medium of claim 15, wherein updating the clock of the first device comprises:

determining a neighbor ratio rate based on the first period of time and the second period of time.

17. The non-transitory computer-readable medium of claim 16, wherein updating the clock of the first device further comprises:

calculating a delay indicating an amount of time that for data to travel across a communication link connecting the first device to the second device in the half-duplex computing system.

18. The non-transitory computer-readable medium of claim 17, wherein calculating the delay comprises:

determining a third period of time spanning from a fifth time at which the second device transmitted time information to the first device in a third previous communication to the second time at which the second device received the sync-header in the second previous communication transmitted by the first device, the third previous communication having been transmitted between the second previous communication and the first previous communication;

determining a fourth period of time spanning from a sixth time at which the first device received the time information in the third previous communication to the fourth time at which the first device transmitted the second previous communication to the second device; and calculating the delay based on the third period of time and the fourth period of time.

19. The non-transitory computer-readable medium of claim 15, the operations further comprising:

after updating the clock of the first device, transmitting, to the second device, time information comprising a third set of time stamp values captured by the first device according to the clock of the first device, wherein second device uses the third set of time stamp values to update the clock of the second device.

20. The non-transitory computer-readable medium of claim 15, wherein the first period of time spans two cross-over period during which a direction of communications in the half-duplex computing system alternates between a first direction and a second direction.

* * * * *